(12) United States Patent
Berini et al.

(10) Patent No.: US 9,661,277 B2
(45) Date of Patent: May 23, 2017

(54) SYSTEM AND METHOD FOR MAKING A TELECONFERENCE WITH REALISTIC SIMULATION OF A DIRECT CONVERSATION

(71) Applicant: UNICREDIT S.p.A., Rome (IT)

(72) Inventors: Marco Berini, Massa Carrara (IT); Riccardo Prodam, Milan (IT)

(73) Assignee: UNICREDIT S.p.A., Rome (IT)

( * ) Notice: Subject to any disclaimer, the term of this patent is extended or adjusted under 35 U.S.C. 154(b) by 0 days.

(21) Appl. No.: 14/899,954

(22) PCT Filed: Jun. 23, 2014

(86) PCT No.: PCT/IB2014/062539
§ 371 (c)(1),
(2) Date: Dec. 18, 2015

(87) PCT Pub. No.: WO2014/207649
PCT Pub. Date: Dec. 31, 2014

(65) Prior Publication Data
US 2016/0142676 A1    May 19, 2016

(30) Foreign Application Priority Data
Jun. 26, 2013    (IT) .............................. MI2013A1065

(51) Int. Cl.
*H04N 7/14*    (2006.01)
*H04N 7/18*    (2006.01)
(Continued)

(52) U.S. Cl.
CPC .................. *H04N 7/18* (2013.01); *G06T 7/70* (2017.01); *H04N 7/142* (2013.01); *H04N 9/3179* (2013.01)

(58) Field of Classification Search
CPC ........ H04N 7/144; H04N 7/15; H04N 9/3179; H04N 7/142; G06T 7/70
(Continued)

(56) References Cited

U.S. PATENT DOCUMENTS 8,179,417 B2 *  5/2012  Robinson ............... G06Q 10/00
                                                        348/14.01
8,587,634 B1 *  11/2013  Baldino ................... H04N 7/15
                                                        348/14.08
(Continued)

FOREIGN PATENT DOCUMENTS

WO       03043327 A1    5/2003
WO    2007/123960 A2    11/2007

OTHER PUBLICATIONS

International Search Report for corresponding International Patent Application No. PCT/IB2014/062539, mailed Oct. 16, 2014.

*Primary Examiner* — Stella Woo
(74) *Attorney, Agent, or Firm* — Merchant & Gould P.C.

(57) ABSTRACT

A system teleconferences first and second speakers in first and second connected remote teleconference sites. Each teleconference site includes corresponding transceivers to transmit and receive electronic signals. First and second acquirers are configured to acquire an image of the first and second speakers, and to generate the electronic signals based on the acquired image. First and second remote image displays process the electronic signals to display the image of the remote speaker. The first remote image display includes a processor with a screen to display the image of the remote speaker. The first acquirer is adjacent the screen, so the acquired image of the first speaker, while looking at the image of the second speaker, is similar to an image acquired if the first speaker would look at the first acquirer. The
(Continued)

second display includes a displaying screen suitable to contain an image projected life-size of the first speaker.

17 Claims, 3 Drawing Sheets

(51) Int. Cl.
*H04N 9/31* (2006.01)
*G06T 7/70* (2017.01)

(58) Field of Classification Search
USPC .................. 348/14.16, 14.07, 14.08, 14.09
See application file for complete search history.

(56) References Cited

U.S. PATENT DOCUMENTS

| | | | |
|---|---|---|---|
| 8,711,201 B2* | 4/2014 | Gorzynski | 348/14.01 |
| 9,141,864 B2* | 9/2015 | Levy | G06K 9/00912 |
| 2005/0007445 A1* | 1/2005 | Foote | H04N 7/142 |
| | | | 348/14.08 |
| 2005/0024484 A1 | 2/2005 | Leonard et al. | |
| 2013/0010053 A1* | 1/2013 | Daddi | A47C 31/00 |
| | | | 348/14.08 |
| 2013/0063544 A1* | 3/2013 | Kanniappan | G06Q 10/10 |
| | | | 348/14.07 |

* cited by examiner

SYSTEM AND METHOD FOR MAKING A TELECONFERENCE WITH REALISTIC SIMULATION OF A DIRECT CONVERSATION

This application is a National Stage Application of PCT/IB2014/062539, filed 23 Jun. 2014, which claims benefit of Serial No. MI2013A001065, filed 26 Jun. 2013 in Italy and which applications are incorporated herein by reference. To the extent appropriate, a claim of priority is made to each of the above disclosed applications.

TECHNOLOGICAL BACKGROUND OF THE INVENTION

Application Field

The present invention relates to the technical field of making teleconferences by electronic means. In particular, the invention relates to a system for making a teleconference with a realistic simulation of a direct conversation. The invention also relates to a method for making a teleconference, in which the above-mentioned system is used.

Description of the Prior Art

Several methods and systems for making teleconferences (in particular, audio-video conferences), that allow speakers located in remote locations from one another to communicate, are known and more and more widespread, for example, allowing meetings in which the participants are in different locations, suitably equipped for making the teleconference. Such systems are based on electronic means, for the audio-video acquisition and reproduction, and for the telecommunication of the corresponding signals. In particular, the apparatuses that make the teleconference possible, in each of the equipped sites, are typically video cameras and microphones, to acquire video-audio signals to be sent remotely; screens (for example televisions) and loudspeakers to reproduce the video-audio signals coming from remote; interface devices, which manage the video-audio signals received, or to be transmitted, and interfacing with a telecommunications network.

In this field, the need is much felt, to ensure an interaction that is as much as possible realistic between speakers and an accurate simulation of a natural interlocution, so that the teleconference meetings are more and more similar to real meetings, where the participants are present together.

To this aim, systems and methods are known, which are suitable to improve, in several aspects, the quality of the teleconference: for example, increasing the quality of the audio-video signals, by an improvement of the audio-video acquisition and reproduction devices, and of the telecommunications systems adopted; or, increasing the number of video cameras and/or microphones installed, and consequently being able to send a plurality of sounds/images, which can be managed by the apparatuses at the remote site to improve the projection/reproduction service; or, again, adding and integrating other communication means, for example, e-mail, ftp, or other services for sending electronic files, until even allowing the remote projection of electronic files in conjunction with, in addition to or in replacement of the images and sounds.

In spite of the availability of solutions somehow advanced, as those mentioned above, those skilled in various fields (relating to aspect that are both technological and behavioral/psychological) agree in saying that, to date, a considerable difference still remains between the naturalness and the efficiency ensured by a direct interaction and those allowed by a mediated, remote interaction.

In particular, in the field of consulting services, where the interaction between the consultant and the customer is essential for the consultant success and the customer satisfaction, the degree of reality simulation of the interaction allowed by a teleconference is not sufficient to ensure the desired requirements. This fact results in a non-optimal quality of the offered service, or even in a barrier that actually prevents the diffusion of the remote consulting activity. For example, there is no doubt that the customer prefers a direct interaction, and that he/she is led, maybe only unconsciously, to mistrust a remote consulting.

On the other hand, it is also apparent that considerable advantages would originate from a diffusion of remote consulting services, both to the provider, who/which could optimize the costs and quality of the consulting, providing to all customers, also the remote ones, a pool of experts and specialists, present for example at their headquarters; and to the customers, who could access to the above-mentioned optimized services also from peripheral locations compared to the headquarters, and more cost-effective for them.

Consider, only by way of example, a specialized financial advice, given by a pool of experts of a headquarter of a bank institution and available to each customer of any branch of that bank, provided that it is equipped with teleconference apparatuses. In order to allow that such kind of service may emerge, be accepted, become efficient and widespread, it is necessary that a perceivable improvement is achieved of the possibilities to communicate in remote in a realistic and natural manner.

From what has been stated above, it shall be understood that the need is strongly felt, of having such teleconference systems and methods as to ensure a natural and efficient communication, so as to make the conversations and interaction from remote as similar as possible to those established in a real meeting, and to give the speakers the impression to be present together. Such need, generally felt in many fields, is particularly compelling in the field of the provision of consulting services from remote, where it is even an enabling element as regard the possibility itself to diffuse such services.

SUMMARY OF THE INVENTION

Therefore, the object of the present invention is to devise and provide a system and a method for making a teleconference, which are improved so as to meet the above-mentioned needs, and capable of obviating the drawbacks described herein above with reference to the prior art.

BRIEF DESCRIPTION OF THE DRAWINGS

Further characteristics and advantages of the system and method for making a teleconference, according to the present invention, will be apparent from the description set forth below of preferred embodiment examples, given by way of indicative, non-limiting example, with reference to the accompanying Figures, in which.

DETAILED DESCRIPTION OF THE PREFERRED EMBODIMENTS

Figure 1:
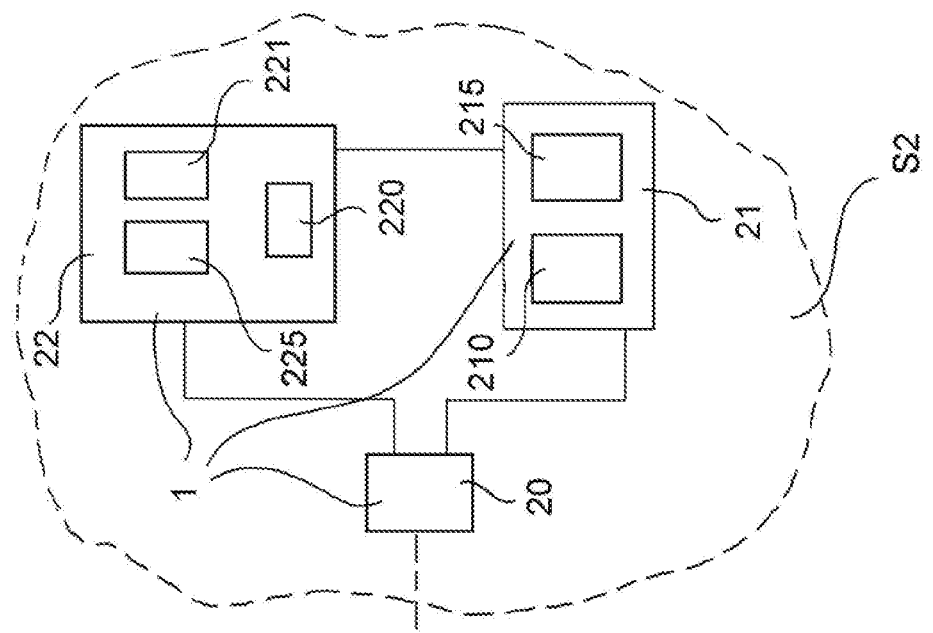
FIG. 1 sets forth a simplified scheme of the system, according to an embodiment of the invention, in terms of functional blocks (without reference to either the implementation or the physical structure of the system); it shall be noticed that, for illustrative purposes, the system is shown in an applicative context comprising also some parts (indicated by a hatching) not belonging to the system itself.
Figure 1:
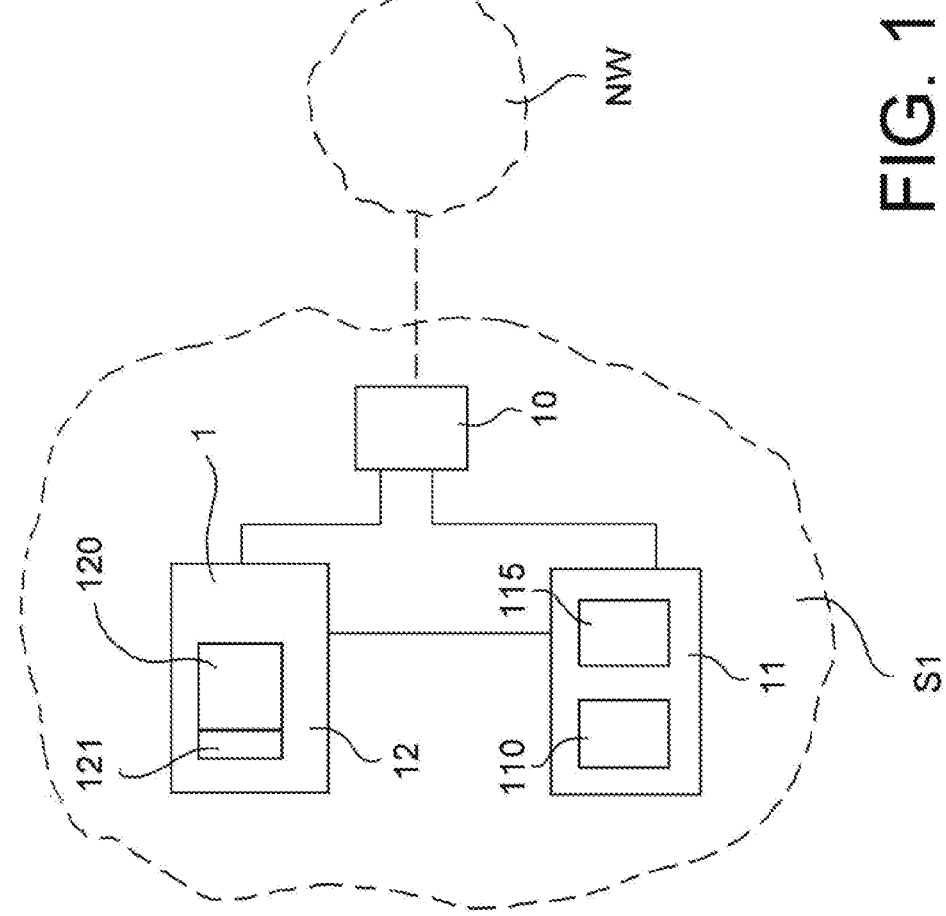

With reference to the FIGS. 1-5, a teleconference system according to the invention is herein described. In particular, a system 1 is illustrated, for making a teleconference between at least one first and at least one second speakers (indicated by the references I1 and I2), present in a first and in a second teleconference sites remote from one another, respectively (indicated by the references S1 and S2) connectable by a telecommunications network NW.

Such system comprises, in the first site S1, first transceiver means 10, configured to transmit to the second site S2 first electronic signals generated in the first site and to receive second electronic signals generated in the second site; and it further comprises, in the second site S2, second transceiver means 20, configured to transmit to the first site S1 the second electronic signals and to receive the first electronic signals. The first and second transceiver means 10 and 20 are connectable to a telecommunications network NW, in order to make a connection between the two sites S1, S2. In other words, in each of the teleconference sites, the system comprises corresponding transceiver means, configured to transmit to the other site electronic signals generated therein, and to receive electronic signals generated in the other site.

Furthermore, in each of the teleconference sites, the system comprises corresponding first and second acquisition means (indicated with the references 11 and 21, respectively), configured to acquire at least one image of the first speaker and at least one image of the second speaker, respectively, and to generate the above-mentioned first and second electronic signals, respectively, based on the acquired image; such first and second acquisition means 11, 21 are operatively connected, respectively, to the already mentioned first and second transceiver means 10, 20.

The system then comprises, in each of the teleconference sites, corresponding first and second remote image displaying means (indicated by the references 12 and 22, respectively), operatively connected to the first and second transceiver means 10, 20, to receive, respectively, the second and first electronic signals (i.e., the electronic signals generated in the other site). The first and second displaying means 12, 22 are configured to process the above-mentioned electronic signals so as to display, based on them, at least one image of the remote speaker, acquired remotely and transmitted remotely.

In the system according to the invention, the first remote image displaying means 12 comprise first processing means 120, provided with an electronic screen 121, configured to display the image 32 of the second remote speaker in a displaying window 125 present in the electronic screen 121 in a predetermined position.

Furthermore, the first acquisition means 11 are arranged adjacent to the electronic screen 121 and adjacent to the displaying window 125, so that the acquired image of the first speaker I1, while he/she looks at the image 32 of the second speaker I2 in the displaying window 125, is similar to or substantially identical to the image that would be acquired if the first speaker I1 would look at the first acquisition means 11. In particular, as it will be better illustrated hereinafter, the above-mentioned similarity or substantial identity relates to the substantial rendering of the first speaker's look I1 in one and in the other one of the above-mentioned images.

The second displaying means 22 comprise a displaying screen 221, having shape and dimensions suitable to contain an image projected in life-size (indicated by 31) of the first speaker I1.

With reference to the second displaying means 22, in the second site S2, it shall be noticed that the image 32 of the remote speaker, displayed on the displaying screen 221, is the image that was acquired and transmitted from the remote site (first site S1) and that was received in the second site S2. It shall be noticed that, in different embodiment examples (that will be better illustrated by describing hereinafter the method according to the invention) such image 31 may comprise the image of the face only of the remote speaker, or the image of the face and the whole bust, or the image of the face and part of the bust. In a preferred embodiment, the image of the first speaker comprises the face and a part of the bust, such as the visible image of a speaker arranged sat ahead, for example, on the other side of a desk.

With reference to the "life-size" of the image 31 of the first speaker, we mean in this description the life-size as perceived by the second speaker I2, located in the position provided for him in the second site S2 at a certain distance from the screen 221. Therefore, the image displayed in life-size can herein refer to both a displayed image that exactly mirrors the dimensions of the original, and a displayed image the dimensions of which are suitably scaled by the system, in order to ensure or improve the perception of naturalness by the second speaker I2.

In accordance with an embodiment of the system, the displaying screen 221 is a projection screen 221, having shape and dimensions suitable to contain an image 31 projected in life-size and/or scaled of the first speaker. Furthermore, in that case, the second displaying means 22 also comprise an electronic projector 225, configured to project a life-size and/or scaled image of the first speaker onto the projection screen 221.

Referring again to the part of the system in the second site S2 (illustrated in the FIGS. 4 and 5), it shall be noticed that, according to a preferred embodiment of the system, the projection screen 221 is located between the electronic projector 225 and the second speaker I2. Furthermore, the projection screen 221 comprises a transparent support, and a rear-projection film, contained in the transparent support, configured so that an image projected onto the film, coming from the side thereof facing the electronic projector 225, is shown on the opposite side of the film, facing the second speaker I2.

In other words, according to the embodiment illustrated herein, the second displaying means 22 act as a rear-projection system, in order to improve the effect of naturalness of the teleconference. The rear-projection provides for a back-lighting of the projection screen 221, which is of course transparent and allows the second speaker I2 seeing the projected image 31 of the first speaker, onto the projection screen 221, as if he/she were actually in front of him/her. In order to obtain this result, the projection screen 221 employs a per se known rear-projection film, for example, a film with variable optical transparency and/or adhesive film with optical prismatic support.

The electronic projector 225 may be a per se known projector, capable of receiving video signals and of converting them into images to be projected. The electronic projector 225 may have manual and/or automatic adjusting means, for the focus, brightness, and dimensions of the projected image.

According to an embodiment example, the projector 225 adjustments are defined so as to be related to the mutual positions of the projector 225, screen 221, and speaker I2, according to per se known criteria, so that the desired image, in life-size or similar, of the remote speaker is reproduced onto the projection screen 221, in front of the speaker I2 in situ.

In accordance with a particular embodiment, the projection screen 221 has an anthropomorphic shape, or it is shaped like a backrest of a chair or armchair. Advantageously, this contributes to further improve the realistic effect. Similarly, other similar measures can be employed, related to the shape, dimension, and background of the projection screen.

It shall be noticed that, according to a further embodiment also encompassed in the invention, alternative to the previous one, the displaying screen 221 in the second site can be a different kind of screen, for example, an electronic monitor with appropriate shape and dimensions (according to the criteria indicated above). In this case, the electronic monitor is typically connected to a computer that performs the functions of adaptation and scaling of the image to be displayed.

Referring now to both teleconference sites (the first site S1 considered in the FIGS. 2 and 3, and the second site S2 considered in the FIGS. 4 and 5), it shall be noticed that the first and second acquisition means 11, 21 comprise first and second video acquisition means 110, 210, respectively, configured to convert the acquired images into corresponding first and second video signals. In such a case, the above-mentioned first and second electronic signals, which are remotely transmitted between the sites, comprise such first and second video signals.

In accordance with a preferred embodiment, the first and second acquisition means 11, 21 further comprise first and second audio acquisition means 115, 215, respectively, configured to convert the detected sounds into corresponding first and second audio signals. In this case, the above-mentioned first and second electronic signals also comprise the first and second audio signals.

According to an embodiment example, the first video acquisition means 110 comprise a first video camera 110, and the second video acquisition means 210 comprise a second video camera 210.

Similarly, according to an embodiment example, the first audio acquisition means 115 comprise one or more first microphones 115, and the second audio acquisition means 215 comprise one or more second microphones 215.

The first and the second transceiver means 10, 20, in an embodiment, comprise corresponding telecommunication devices, operatively connected to the telecommunications network NW, more specifically, to the corresponding access network that reaches the first and the second sites. This involves that such telecommunication devices, per se known, support the transmission technology of the telecommunications network, for example, DSL, or, preferably IP. In particular, the telecommunication devices support an appropriate protocol stack (for example, an OSI stack suitable to ensure the telecommunication functionalities to the different OSI levels).

Optionally, the second transceiver means 20 comprise signal format adapters, configured to adapt the format of the audio/video input/output signals of the projector and the format required by the telecommunications network interface.

Referring now specifically to the first teleconference site S1 (illustrated in the FIGS. 2-3), it shall be noticed that the first video camera 110 is configured to acquire the image of the first speaker within a predetermined image acquisition angle, i.e., within two acquisition angles: a horizontal angle θ defined on a horizontal plane comprising the framing axis (not illustrated in FIG. 2), and a vertical angle φ (illustrated in FIG. 2) defined on a vertical plane comprising the framing axis. Typically, such angles θ and φ are nearly the same or similar to one another, and video cameras 110 can easily be employed, whereby θ and φ, in the present invention, range for example between 50° and 75°, and they preferably are of about 60°.

Figure 2:
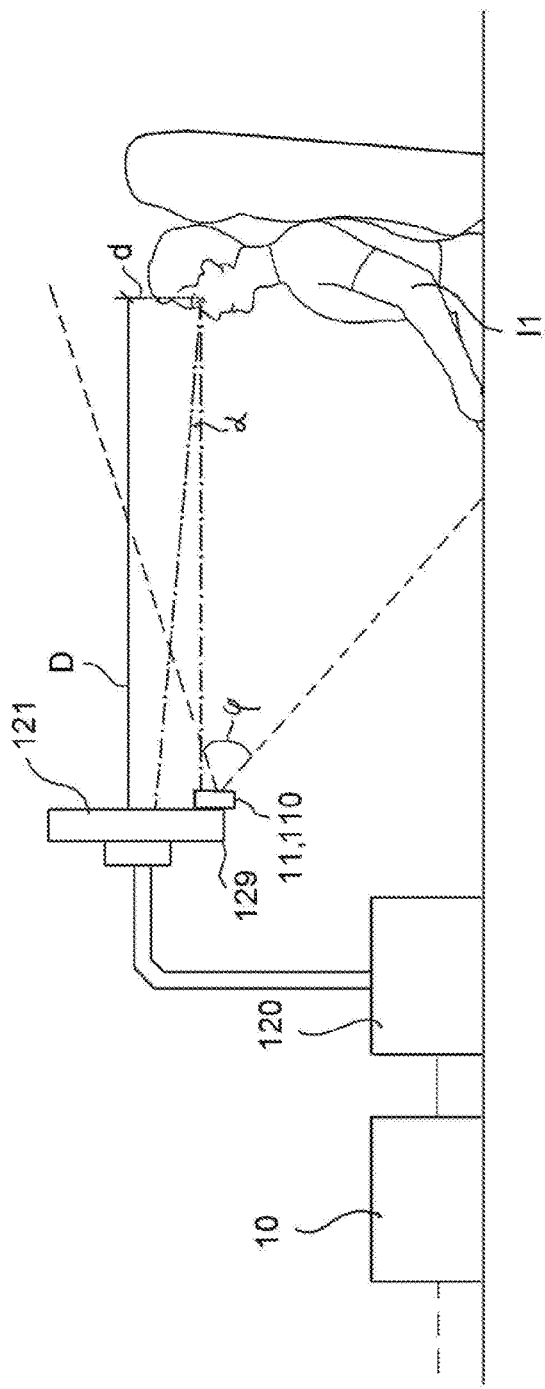
FIG. 2 illustrates—in a side view—a part, present in a first site, of the structure of the system of FIG. 1, in a particular applicative context.
Figure 3:
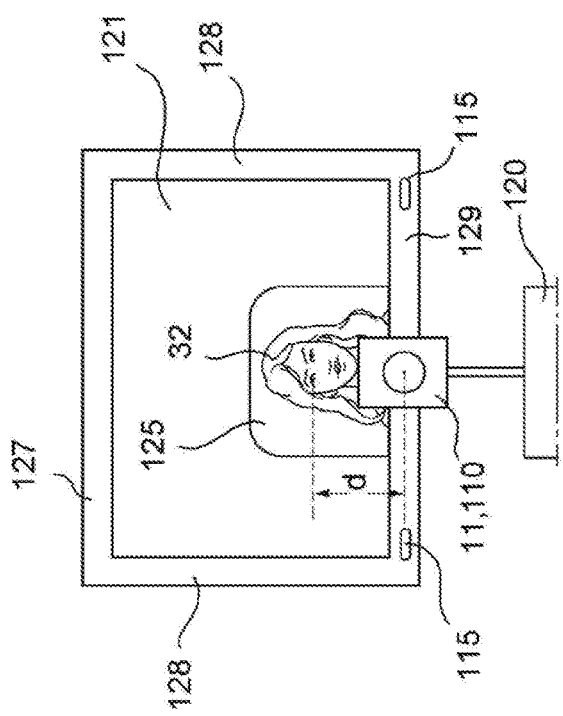
FIG. 3 represents a front view of a detail of the system of FIG. 2.
Figure 4:
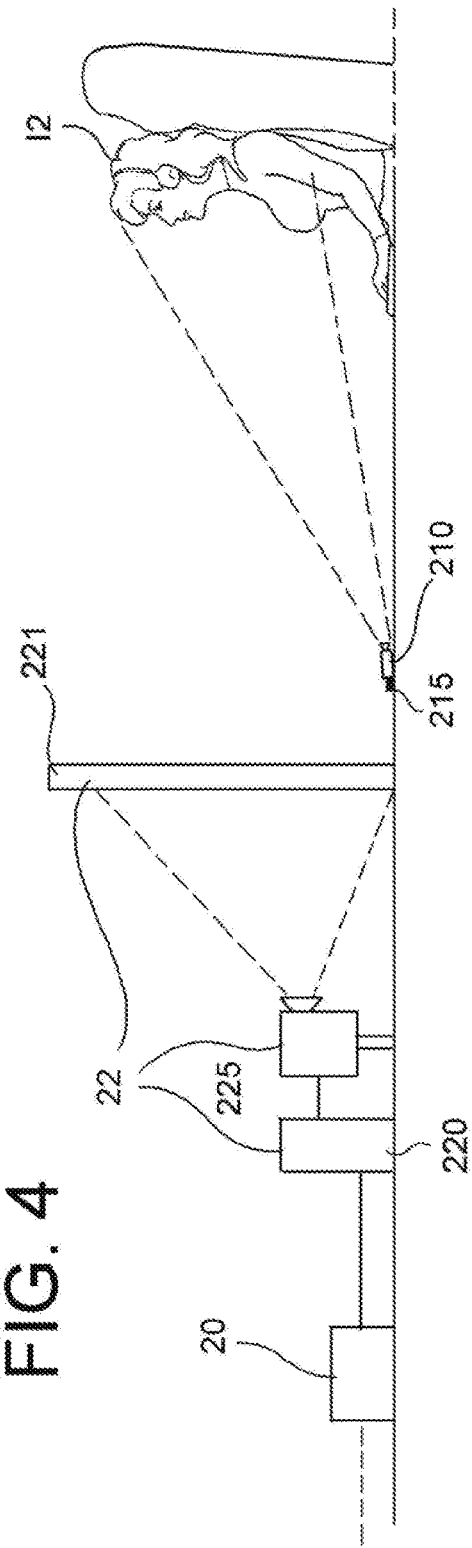
FIG. 4 illustrates—in a side view—a part, present in a second site, of the structure of the system of FIG. 1, in a particular applicative context.
Figure 5:
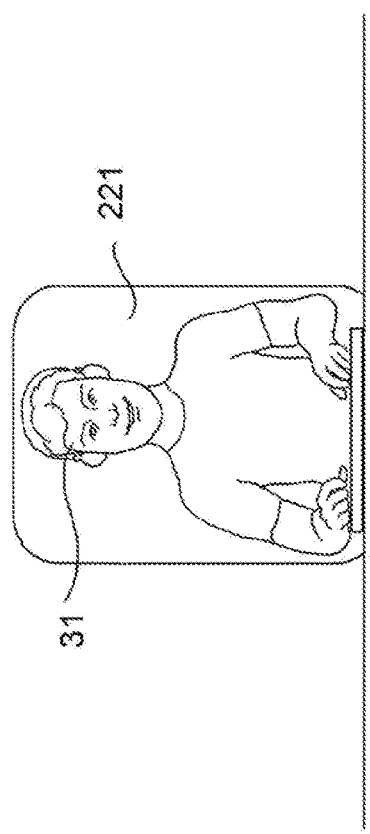
FIG. 5 represents a front view of a detail of the system of FIG. 4.

Furthermore, in accordance with an embodiment of the system, the arrangement of the first video camera 110, with respect to the electronic screen 121 of the first displaying means 12, is such that the angle α formed by the look directions of the first speaker I1 towards the first video camera 110 and towards the displaying window 125 is much less than the image acquisition angle (or of each of the acquisition angles, in particular, in the representation of FIG. 2, α<<φ).

In a preferred embodiment example, the distance D of the first speaker I1 from the electronic screen 121 and the first video camera 110, adjacent thereto, ranges between 50 cm and 100 cm. The distance d between the objective of the first video camera 110 and the center of the displaying window 125 is few centimeters (typically, less than 5 cm). In this case, the angle α formed by the look directions of the first speaker I1 towards the first video camera 110 and towards the displaying window 125 can be approximated as arctan (d/D). With the above-mentioned values of d and D, it may be assessed that the angle α is less than 0.1 radiants (i.e., less than 5°).

Now, assuming that the displaying window 125 is laterally adjacent to the video camera 110, the relevant acquiring angle, by comparison with the angle α, is the horizontal angle θ. Instead, assuming that the displaying window 125 is adjacent to the upper or lower part of the video camera 110 (as shown in the FIGS. 2 and 3), the relevant acquiring angle, by comparison with the angle α, is the vertical angle φ. In both cases, with the arrangement illustrated above, and providing that each of the acquisition angles θ and φ is, e.g., of about 60°, in any case the above-mentioned condition is met, since the angle α is much less than both the angle θ and the angle φ.

By virtue of the characteristics specified above, it is better understood the meaning and the way of obtaining the similarity or substantial identity between the image of the first speaker acquired while he/she looks at the image of the second speaker 32 in the displaying window 125, and the image of the first speaker that would be acquired if the first speaker I1 would directly look at the first video camera 110. In particular, such similarity or substantial identity means that the two above-mentioned images appear substantially undistinguishable, when projected in life-size in the second site S2 to the second speaker I2, which involves that the second speaker I2, when the image of the first speaker looks at him/her, in the displaying screen 221, will have the impression that the look of the first speaker is directed to him/her directly.

In accordance with an embodiment, the first video camera 110 is a webcam. Such webcam 110, by virtue of its small dimensions, is arranged at an upper 127 or lower 129 or side 128 edge of the electronic screen 121. In this case, the first processing means 120 are configured to show the displaying window 125 in a position of the electronic screen 121 such that a side of the displaying window 125 is contiguous, respectively, to the edge at which the webcam 110 is located, i.e., the upper 127 or lower 129 (as illustrated by way of example in FIG. 3) or side 128 edge of the electronic screen 121.

According to a particular embodiment example, the electronic screen 121 is advantageously arranged so that the edge of the screen at which the webcam 110 is located, if such edge is the lower or upper one, is substantially at the same height of the eyes of the first speaker I1, so that the look direction of the first speaker I1 towards the displaying window is a substantially horizontal direction. In particular, if the webcam 110 is arranged at the lower edge 129 of the electronic screen 121, the screen is placed slightly higher, so that the lower edge 129 thereof is at the level of the eye of the first speaker I1, when he/she is sitting in front of the screen in a speaking position. In this case, the displaying window 125 is shown in the lower part of the screen 121, adjacent to the lower edge 129 where the webcam 110 is located.

According to an advantageous embodiment example, the first video camera 110 is arranged so that the objective of the first video camera 110 at least partially overlaps the displaying window 125. For example, consider a webcam 110 having a body secured at an edge of the electronic screen 121 and the objective partially overlapping the displaying window 125. Due to the small dimensions of the webcam 110, this allows the first speaker I1 to see the image of the other speaker well in the displaying window 125, and at the same time this allows to further reduce the distance d between the centre of the displaying window 125 and the objective of the webcam 110 (with the advantageous effects already described above).

In accordance with a particular embodiment, the first displaying means 12 comprise a computer 120 provided with a screen 121; in this case, the first video camera 110 (for example, the webcam) is operatively connected to such computer 120. Typically, the computer 120 is configured to support the teleconference, in a per se known manner; in this case, part of the functions of the first transceiver means 10 may be integrated in the computer.

In order to perform the actions described above, relating to the management of the electronic screen 121 and the displaying of the displaying window 125 in the appropriate position, a suitable set of software programs is loaded and operating in the computer 120, comprising at least an operating system, a displaying management program, and, optionally, a teleconference management program.

It shall be noticed that, although the detailed description of the system 1, set forth above, is referred to the interaction between two speakers I1, I2, one in the first site and one in the second site, the invention can be generalized to deal with the situation in which there is a plurality of speakers, either in the first, or in the second site, or in both sites S1, S2.

To this aim, according to one of the possible embodiments, the system 1 comprises in the first site a plurality of first processing means 120 and corresponding first acquisition means 11, at a corresponding plurality of first speakers; in this case, the first acquisition means 11 are configured to generate a corresponding plurality of first electronic signals.

In several embodiment variants, the plurality of first electronic signals is transmitted to the second site S2; in this case, in the second site S2 a plurality of corresponding electronic projectors 225 and a plurality of corresponding projection screens 221 is provided, in which each electronic projector 225 is configured to project on the corresponding projection screen 221 a corresponding received image, corresponding to one of the images of the first speakers.

Alternatively, the first processing means 120 are further configured to receive from the acquisition means 11 the plurality of first audio signals, and to select a subset of video signals to be transmitted to the second site, based on a processing of the first audio signals.

Such subset may also comprise the only image of that one, among the first speakers, who is speaking or who is speaking in a louder voice volume.

Assume, for example, the case in which there are multiple first speakers I1 (e.g., a pool of consultants) at the first site S1, and in which there is a single customer I2 in the second site, located in front of only one projection screen 221. In this case, the function of the system 1 described above is particularly advantageous, i.e., the ability of the first processing means 120 to collect all the video images of the first speakers I1 and all the audio signals of the first speakers I1; then, to process such audio signals (for example, estimating the one having the highest intensity, or applying similar criteria) to determine which one of the first speakers I1 is speaking; then, to select and send to the second site S2 only the image of the speaker who is speaking, so that the image 31 of the speaker who is speaking is projected in front of the second remote speaker I2. Of course, in this case, when the speaker I1 who is speaking changes in the first site S1, also the image 31 that is projected in the second site S2 changes, so that the second speaker I2 always sees in front of him/her the image of the interacting speaker, keeping the continuity of the effect of reality and naturalness of the interaction.

According to another possible embodiment, the system 1 comprises in the second site S2 a plurality of second acquisition means 21, at a corresponding plurality of second speakers I2; the second acquisition means 21 are configured to generate a corresponding plurality of second electronic signals.

In an embodiment variant, the plurality of second electronic signals is transmitted to the first site, and, in the first site S1, the first processing means 120 are configured to show each of the received images, corresponding to one of the second speakers I2, in a corresponding window in the electronic screen 121; the first processing means 120 are further configured to show in the displaying window 125, present in the predetermined screen position, the image 32 of that one, between the second speakers, who is speaking, or who is speaking in a in a louder voice volume.

In an embodiment example, the second displaying means 22 further comprise second processing means 220, operatively connected to the second acquisition means 21, to receive the second audio signals, and they are further configured to select a subset of second electronic signals to be transmitted to the first site S1 based on a processing of the second audio signals.

In another embodiment variant, the second processing means 220 are further operatively connected with the second transceiver means 20 and with the second acquisition means 21, and they are configured to adapt the first electronic signals received at the electronic projector, and the second electronic signals to be transmitted.

It shall be noticed that, in a further embodiment of the system 1, in a physical site of teleconference, both the apparatuses defined herein as belonging to the first site S1, and the apparatuses defined herein as belonging to the second site S2 can be present.

A method for making a teleconference, implemented by means of the system 1 described above, is described herein below.

In particular, a method for making a teleconference between at least one first (I1) and at least one second speaker (I2), respectively, present in a first (S1) and a second (S2) teleconference sites remote from one another, connectable by a telecommunications network NW, is described herein.

In accordance with an embodiment, the method first comprises the step of acquiring, by the first 11 and second 21 acquisition means, at least one first image of the first speaker and at least one second image of the second speaker; then, generating first and second electronic signals based on such first and second acquired images; then, transmitting from the first S1 to the second S2 site the first electronic signals and transmitting from the second S2 to the first S1 site the second electronic signals; then, receiving in the first S1 and in the second site S2 the second and first electronic signals, respectively.

The method then comprises the step of displaying the at least one second image 32, in the first site S1, based on a processing of the received second electronic signals; and displaying the at least one first image 31, in the second site S2, based on a processing of the received first electronic signals.

In particular, the step of displaying the at least one first image 31 comprises the steps of providing in the second site S2 a displaying screen 221 having shape and dimensions suitable to contain a life-size (i.e., full-size) image 31 of the first speaker I1, and displaying such first image 31 onto the displaying screen 221.

Furthermore, the step of displaying the at least one second image 32 comprises the steps of providing, in the first site S1, first processing means 120 provided with an electronic screen 121; then, displaying, by the first processing means 120, the image 32 of the second remote speaker in a displaying window 125 present in the electronic screen 121 in a predetermined position; finally, arranging the first acquisition means 11 adjacent to the electronic screen 121 and to the displaying window 125, so that the acquired image of the first speaker I1, while he/she looks at the image 32 of the second speaker in the displaying window 125, is similar to or substantially identical to the image that would be acquired if the first speaker I1 would look at the first acquisition means 11.

In accordance with an embodiment of the method, the step of displaying the at least one first image 31 provides for that the displaying screen 221 is a projection screen 221; furthermore, such step of displaying further comprises the steps of providing in the second site S2 an electronic projector 225, and projecting, onto the projection screen 221, by the electronic projector 225, the at least one first image 31 of the first speaker I1, in life-size.

According to a particular embodiment of the method, the first acquisition means 11 acquire the image of the first speaker I1 within a preset image acquisition angle (θ, φ). Furthermore, the arrangement of the first acquisition means 11, with respect to the electronic screen 121 of the first displaying means 12, is such that the angle α formed by the look directions of the first speaker I1 towards the first acquisition means 11 and towards the displaying window 125 is much less than the above-mentioned image acquisition angle (θ, φ).

In accordance with an embodiment example, the look direction of the first speaker I1 towards the displaying window 125 is a substantially horizontal direction.

In an embodiment, the displaying window 125 is shown in such a position that a side of the displaying window 125 is contiguous to an upper 127 or lower 129 or side 128 edge of the electronic screen 121; in this case, the first acquisition means 11 are arranged at such upper 127 or lower 129 or side 128 edge of the electronic screen 121, respectively.

In a particular embodiment, the above-mentioned step of displaying the first image 31 in the second site S2 further comprises the steps of arranging the projection screen 221 between the electronic projector 225 and the second speaker I2; then, providing, in the projection screen 221, a transparent support containing a rear-projection film, so that an image projected onto the film, coming from the side thereof facing the electronic projector 225, is shown on the opposite side of the film, facing the second speaker I2; finally, back-lighting the projection screen 221, by the electronic projector 225, to project the image 31 of the first speaker, so that it appears in life-size, onto the side of the projection screen opposite the lighting one, and facing the second speaker I2.

In a particular embodiment example, the projection screen 221 has an anthropomorphic shape, or it is shaped like a backrest of a chair or armchair.

According to different embodiment variants of the method, the at least one acquired and projected image 31 of the first speaker comprises the face and at least part of the bust of the first speaker; or, the at least one acquired and projected image 32 of the second speaker comprises at least the face of the second speaker.

In accordance with an embodiment of the method, in the first site S1, a plurality of first speakers I1 is present and a plurality of corresponding first processing means 120 and of corresponding first acquisition means 11 is provided.

The plurality of first electronic signals generated based on the corresponding plurality of images of the first speakers I1 is transmitted to the second site S2. In this case, in the second site S2 a plurality of corresponding electronic projectors 225 and a plurality of corresponding projection screens 221 are provided; each of the received images, corresponding to one of the images of the first speakers, is projected onto the corresponding projection screen 221.

In an alternative embodiment variant, only a selected sub-set of images is transmitted to the second site S2, and each of the images of the selected subset is displayed onto a corresponding displaying screen 221.

In particular, the selected sub-set of images can comprise the only image 31 of that one, among the first speakers I1, who is speaking or who is speaking in a louder voice volume.

According to another embodiment comprised in the invention, in the second site S2 a plurality of second speakers I2 is present and a plurality of corresponding second acquisition means 21 is provided.

In accordance with an embodiment example, the plurality of second electronic signals generated based on the corresponding plurality of images of the second speakers I2 is transmitted to the first site S1; furthermore, in the first site S1, each of the received images, corresponding to one of the images of the second speakers I2, is shown, by the first processing means 120, in a corresponding window in the electronic screen 121; and the image of that one, between the second speakers I2, who is speaking, or who is speaking in a louder voice volume, is shown in the displaying window 125 present in a predetermined screen position.

As it can be noticed, the object of the present invention is achieved by the system and the method described above.

In fact, based on what has been stated above, the effectiveness of the invention in ensuring a realistic and natural teleconference interaction is apparent. In particular, the devices in the "first site" S1 allow the first speaker to exploit a simple and efficient interaction through the electronic screen. Such devices further ensure that the image of the first speaker, while he/she interacts, sitting in front of his/her screen (in conditions similar to the ones which would occur if he/she were sitting at a desk, in front of the second speaker), is substantially the same image that would be taken if the first speaker would look directly at the video camera; and it is very similar, from the remote speaker viewpoint, to the image of the first speaker as if he/she were in front of him/her.

To further improve the impression of reality, the devices in the "second site" S2 display life-size the image of the first speaker, or so that it is perceived in this manner by the second speaker.

Furthermore, the image of the first speaker can be projected, life-size, by back-lighting, onto a projection screen that is obtained to simulate a realistic situation (for example, the backrest of a chair or armchair); in such a manner, the second speaker has the realistic impression to have the first speaker present in front of him/her.

As a non-limiting example, suitable to illustrate a preferred (but, of course, not exclusive) application field of the method according to the invention, it shall be considered the case where the first speaker is a consultant, in a first site that could be the headquarter of a bank; and the second speaker is present in a peripheral branch of the bank, equipped as the "second site" described above. From the above, it is apparent that the realistic interaction that is made possible by the present invention drastically improves the quality and impression of naturalness and reality of the consultant-customer interaction, simulating a presence in the same place, to the advantage of both parts.

Therefore, it is apparent that the solution described herein solves the technical problems set forth above, and allows a neat advantage to the mentioned prior art solutions.

To the embodiments of the method and the system to make a teleconference, described above, those of ordinary skill in the art, in order to meet contingent needs, will be able to make modifications, adaptations, and replacements of elements with functionally equivalent other ones, also together with the prior art, also creating hybrid implementations, without departing from the scope of the following claims.

Each of the characteristics described as belonging to a possible embodiment can be implemented independently from the other embodiments described.

The figures are not necessarily in scale, compared to the real structure of the system, since the illustration clearness is privileged.

It shall be further noticed that the term "comprising" does not exclude other elements or steps, the term "a/an" or "one" does not exclude a plurality.

The invention claimed is:

1. A method for making a teleconference between at least one first speaker and at least one second speaker, present in a first teleconference site and a second teleconference site remote from one another, respectively, connectable by a telecommunications network, the method comprising:
    acquiring, by first and second acquisition means, at least one first image of the first speaker and at least one second image of the second speaker;
    generating first and second electronic signals based on said first acquired image and said second acquired image;
    transmitting from the first site to the second site the first electronic signals and from the second site to the first site the second electronic signals;
    receiving in the first site and the second site said second electronic signal and said first electronic signal, respectively;
    displaying the at least one second image, in the first site, based on a processing of said received second electronic signal;
    displaying the at least one first image, in the second site, based on a processing of said received first electronic signal;
    wherein the step of displaying the at least one first image comprises:
        providing in the second site a displaying screen having shape and dimensions suitable to contain a life-size image of the first speaker, said displaying screen being a transparent projection screen having an anthropomorphic shape or an outline shaped as a chair backrest;
        projecting the at least one first image of the first speaker onto the projection screen by an electronic projector through backlighting; said at least one first image being life-size; and
    wherein the step of displaying the at least one second image comprises:
        providing first processing means, provided with an electronic screen, in the first site;
        displaying, by the first processing means, the image of the second remote speaker in a displaying window present in the electronic screen in a predetermined position;
        arranging said first acquisition means adjacent to the electronic screen and to the displaying window, so that the acquired image of the first speaker, while viewing the image of the second speaker in the displaying window, is similar to or substantially identical to an image that would be acquired if the first speaker would look at the first acquisition means.

2. The method according to claim 1, wherein the first acquisition means acquire the image of the first speaker within a preset image acquisition angle, and wherein the arrangement of the first acquisition means, with respect to the electronic screen of the first displaying means, is such that the angle formed by look directions of the first speaker towards the first acquisition means and towards the displaying window is substantially less than said image acquisition angle.

3. The method according to claim 1, wherein the step of displaying the first image in the second site further comprises:
    arranging the projection screen between the electronic projector and the second speaker;
    providing, in the projection screen, a transparent support containing a rear-projection film, so that an image projected onto the film, coming from a side thereof facing the electronic projector, is shown on an opposite side of the film, facing the second speaker;
    back-lighting the projection screen, by the electronic projector, for projecting the image of the first speaker so that the image appears in life-size onto the side of the projection screen opposite the lighting side, and facing the second speaker.

4. The method according to claim 1, wherein in the first site a plurality of first speakers is present, and a plurality of corresponding first processing means and a plurality of corresponding first acquisition means are provided.

5. The method according to claim 4, wherein the plurality of first electronic signals generated based on the corresponding plurality of images of the first speakers is transmitted to the second site, and wherein, in the second site, a plurality of corresponding displaying screens is provided and each of the received images corresponding to one of the images of the first speakers is displayed on the corresponding displaying screen.

6. The method according to claim 4, wherein only a selected sub-set of images is transmitted to the second site, and wherein each of the images of the selected set is displayed on a corresponding displaying screen;
the selected sub-set of images comprising the only image of one of the first speakers, who is speaking or who is speaking in a louder voice volume.

7. The method according to claim 1, wherein in the second site a plurality of second speakers is present and a plurality corresponding second acquisition means is provided,
wherein the plurality of second electronic signals, generated based on the corresponding plurality of images of the second speakers, is transmitted to the first site, and, in the first site, each of the received images, corresponding to one of the images of the second speakers, is shown, by the first processing means, in a corresponding window in the electronic screen;
and wherein the image of one of the second speakers, who is speaking, or who is speaking in a louder voice volume, is shown in said displaying window present in said predetermined screen position.

8. A system for making a teleconference between at least one first speaker and at least one second speaker, present respectively in a first teleconference site and in a second teleconference site remote from one another, connectable by a telecommunications network, the system comprising:
first transceiver means, in the first site, configured to transmit to the second site first electronic signals generated in the first site and to receive second electronic signals generated in the second site; and second transceiver means, in the second site, configured to transmit to the first site the second electronic signals and to receive the first electronic signals; the first and second transceiver means being connectable to said telecommunications network;
the system further comprising, in each of the teleconference sites:
corresponding first and second acquisition means, configured to acquire at least one image of the first speaker and the second speaker, respectively, and to generate said first and second electronic signals, respectively, based on the acquired image, the first and second acquisition means being operatively connected, respectively, to the first transceiver means and the second transceiver means;
corresponding first and second remote image displaying means, operatively connected to said first and second transceiver means, respectively, to receive the second and first electronic signals, and configured to process said electronic signals so as to display, based on said electronic signals, said at least one image, of the remote speaker;
wherein:
the first remote image displaying means comprise first processing means provided with an electronic screen, said first remote image displaying means being configured to display the image of the second remote speaker in a displaying window present in the electronic screen in a predetermined position;
the first acquisition means are arranged adjacent to the electronic screen and adjacent to the displaying window, so that the acquired image of the first speaker, while viewing the image of the second speaker in the displaying window, is similar to or substantially identical to the image that would be acquired if the first speaker would look at the first acquisition means;
the second displaying means comprise a displaying screen, having shape and dimensions suitable to contain an image, displayed in life-size, of the first speaker, said displaying screen being a transparent projection screen having an anthropomorphic shape or an outline shaped as a chair backrest;
an electronic projector configured to project one of the at least one image of the first speaker in life size onto the projection screen by back lighting.

9. The system according to claim 8, wherein the second displaying means are arranged so that the projection screen is located between the electronic projector and the second speaker; and wherein the projection screen comprises:
a transparent support;
a rear-projection film, contained in said transparent support, configured so that an image projected onto the film, coming from a side thereof facing the electronic projector, is shown on an opposite side of the film, facing the second speaker.

10. The system according to claim 8, wherein the first acquisition means and the second acquisition means comprise first and second video acquisition means, respectively, configured to convert the acquired images into corresponding first and second video signals, and the first and second electronic signals comprise said first and second video signals;
and wherein the first and second acquisition means further comprise, respectively, first and second audio acquisition means, configured to convert detected sounds into corresponding first and second audio signals, and wherein the first and second electronic signals further comprise said first and second audio signals.

11. The system according to claim 10, wherein the first video acquisition means and the second video acquisition means comprise a first video camera and a second video camera, respectively, and
wherein the first video camera is configured to acquire the image of the first speaker within a predetermined image acquisition angle, and wherein the arrangement of the first video camera, with respect to the electronic screen of the first displaying means, is arranged such that an angle formed by a look direction of the first speaker towards the first video camera and a look direction towards the displaying window is substantially less than said image acquisition angle.

12. The system according to claim 11, wherein the first video camera is a webcam, arranged at an upper edge or a lower edge or a side edge of the electronic screen, and wherein the first processing means are configured to display the displaying window in a position of the electronic screen whereby a side of the displaying window is contiguous, respectively, to said edge of the electronic screen.

13. The system according to claim 8, comprising in the first site a plurality of first processing means and a plurality of respective first acquisition means, corresponding to a respective plurality of first speakers, wherein the first acquisition means are configured to generate a corresponding plurality of first electronic signals, and wherein the plurality of first electronic signals is transmitted to the second site, and wherein in the second site a plurality of corresponding electronic projectors and a plurality of corresponding projection screens are provided, each electronic projector being configured to project onto the corresponding projection screen a respective received image, corresponding to one of the images of the first speakers.

14. The system according to claim 13, wherein the first processing means are further configured to receive from the first acquisition means the plurality of first audio signals, and to select a sub-set of video signals, to be transmitted to the second site, based on a processing of the first audio signals.

15. The system according to claim 8, comprising in the second site, corresponding to a plurality of second speakers, a respective plurality of second acquisition means, configured to generate a corresponding plurality of second electronic signals are transmitted to the first site, and wherein, in the first site, the first processing means are configured to display each of the received images, corresponding to one of the second speakers, in a corresponding window in the electronic screen, and are further configured to display in the displaying window, present in said predetermined screen position, the image of one of the second speakers, who is speaking, or who is speaking in a louder voice volume.

16. The system according to claim 8, wherein the second displaying means further comprise second processing means, operatively connected to the second transceiver means and to the second acquisition means, to receive the second video and audio signals, said second processing means being configured to select a subset of second electronic signals to be transmitted to the first site based on a processing of the second audio signals.

17. System according to claim 8, wherein the first remote image displaying means comprise a computer and wherein the electronic screen is a computer monitor.

* * * * *